United States Patent [19]

d'Arras

[11] 4,338,701
[45] Jul. 13, 1982

[54] MEAT TENDERING DEVICE

[75] Inventor: Philippe d'Arras, Paris, France

[73] Assignee: Societe Anonyme dite COUPAX, France

[21] Appl. No.: 183,801

[22] Filed: Sep. 3, 1980

[30] Foreign Application Priority Data

Sep. 4, 1979 [FR] France ............................ 79 22080

[51] Int. Cl.³ .............................................. A22C 9/00
[52] U.S. Cl. ..................................................... 17/25
[58] Field of Search ............................... 17/25, 31, 28

[56] References Cited

U.S. PATENT DOCUMENTS 3,651,541  3/1972  Jaccard ............................... 17/25 X
3,736,583  5/1973  Smith et al. ......................... 17/25 X
4,112,544  9/1978  d'Arras .................................. 17/25

Primary Examiner—Willie G. Abercrombie
Attorney, Agent, or Firm—Schwartz, Jeffery, Schwaab, Mack, Blumenthal & Koch

[57] ABSTRACT

The invention relates to a meat tendering device comprising a frame supporting a movable blade holder assembly facing a grid constituted by grid elements between which blades mounted on said blade holder assembly are adapted to pass. The blade holder assembly is adapted to be displaced toward a base which is adapted to receive the meat to be treated and located below said grid. The blade holder assembly comprises a blade holder block including a blade holder, a framework adapted to receive and maintain firmly in place a plurality of removable cutting blades, and a plate which is located above the blade holder block and which is provided with sliding guides which cooperate with rails integral with the framework.

5 Claims, 3 Drawing Figures

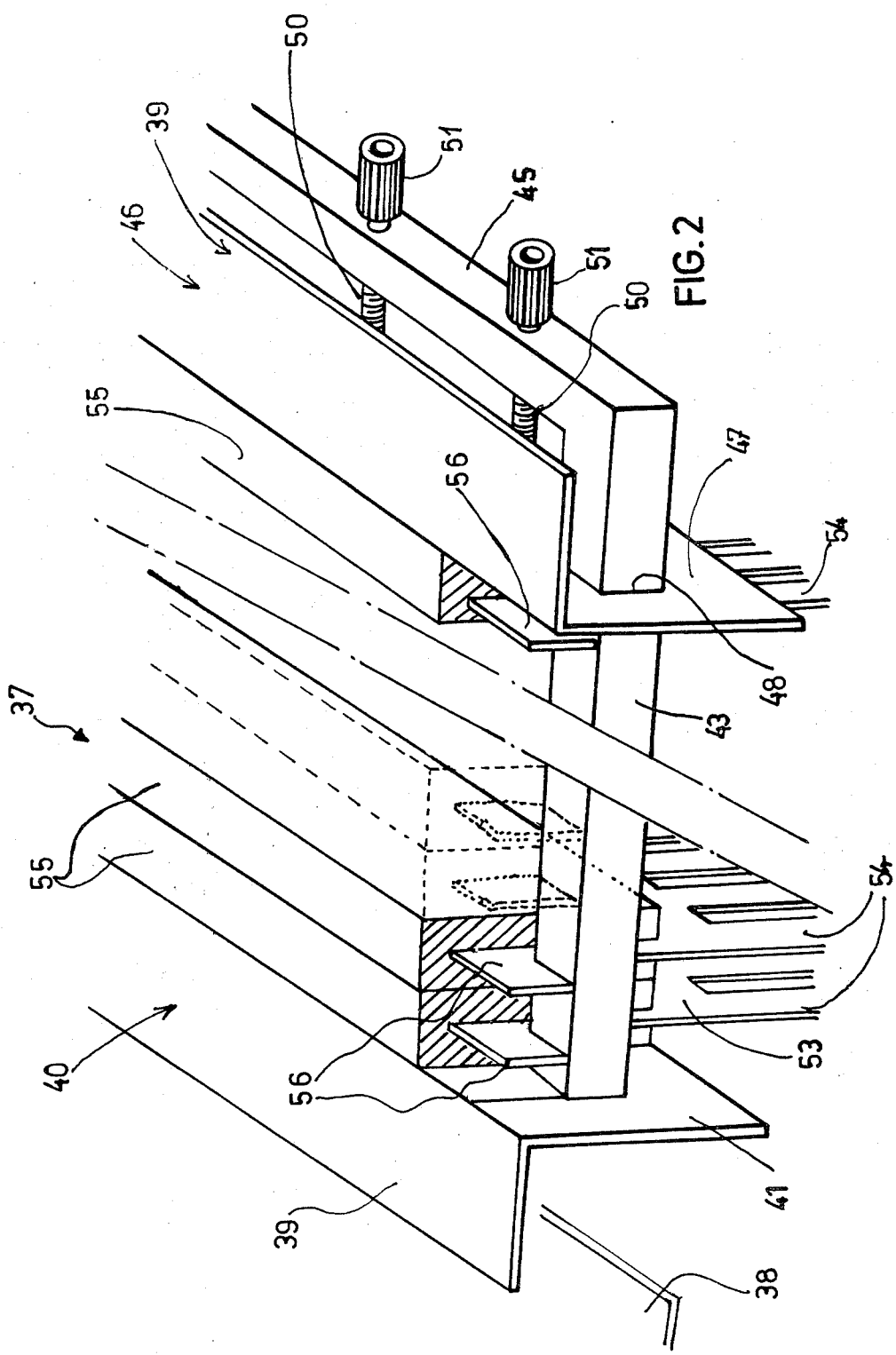

MEAT TENDERING DEVICE

BACKGROUND OF THE INVENTION

The present invention is related to a meat tenderizing device.

Known meat tendering devices comprise—broadly speaking—blades or needles acting as perforating elements on the muscles and aponeurotic membranes or tissues of a piece of meat which is to be rendered tender. For obvious and imperative, especially hygienic reasons, such devices must be easily dismountable for cleaning and disinfecting purposes. Furthermore they must be constructed in such a manner that they prevent the meat to be tendered from being compressed, while also preventing the blades or needles from breaking within the mass of the meat being treated.

The present invention is aimed at providing a novel meat tendering device adapted to meet these requirements in an optimum manner.

SUMMARY OF THE INVENTION

The meat tendering device according to the invention comprises a frame supporting a movable blade holder assembly facing a grid constituted by grid elements between which blades mounted on said blade holder assembly are adapted to pass, said blade holder assembly being adapted to be displaced toward a base adapted to receive the meat to be treated and located below said grid, said blade holder assembly comprising a blade holder block including a blade holder, a frame adapted to receive and maintain firmly in place a plurality of removable cutting blades, and a plate which is located above said blade holder block and which is provided with sliding guides cooperating with rails integral with the said frame.

In one embodiment of the novel device, said frame of the blade holder assembly comprises two parallel rods extending between two clamping flanges, each one of said blades having a blade back and two mutually opposed fingers constituting extensions thereof, each finger resting on one of said rods, whereby said blades are juxtaposed side by side, while the backs of said blades have each a thickness greater than that of the associated blade and maintain a given interval between any blade and the adjacent blade or blades, said backs of the blades being maintained in mutual engagement by the clamping action of said clamping flanges, and the upper portion of each one of said backs engaging the lower surface of said plate when said block is placed under said lower surface of the plate.

In a preferred embodiment said rods of the frame are attached to one of said flanges of said frame and extend through holes provided in the other flange, a cross member connecting those ends of the rods which are opposed to the first-mentioned flange, while one of the ends of at least one threaded rod screwed into a threaded hole provided in said cross member rests on said other flange, whereby screwing said rod results in moving said flanges toward each other.

These and other objects and advantages of the invention become apparent from the following detailed description referring to the appended drawings which is given by way of illustration only, but not of limitation.

BRIEF DESCRIPTION OF THE DRAWINGS

FIG. 2 is a perspective view of a detail of the blade holder block of the device shown in FIG. 1.

DETAILED DESCRIPTION OF THE DRAWINGS AND PREFERRED EMBODIMENTS

In the embodiment shown and described hereinbelow, the meat tendering device according to the invention comprises a base 10, preferably made of a metallic material, on which rests a removable displaceable plaquette made for e.g. of wood, which is adapted to receive a piece of meat to be treated by tendering. Base 10 supports at least two vertical metallic columns 14 the lower ends of which are fixed to said base, and the upper ends of which support a metallic horizontal plate 15.

Figure 1:
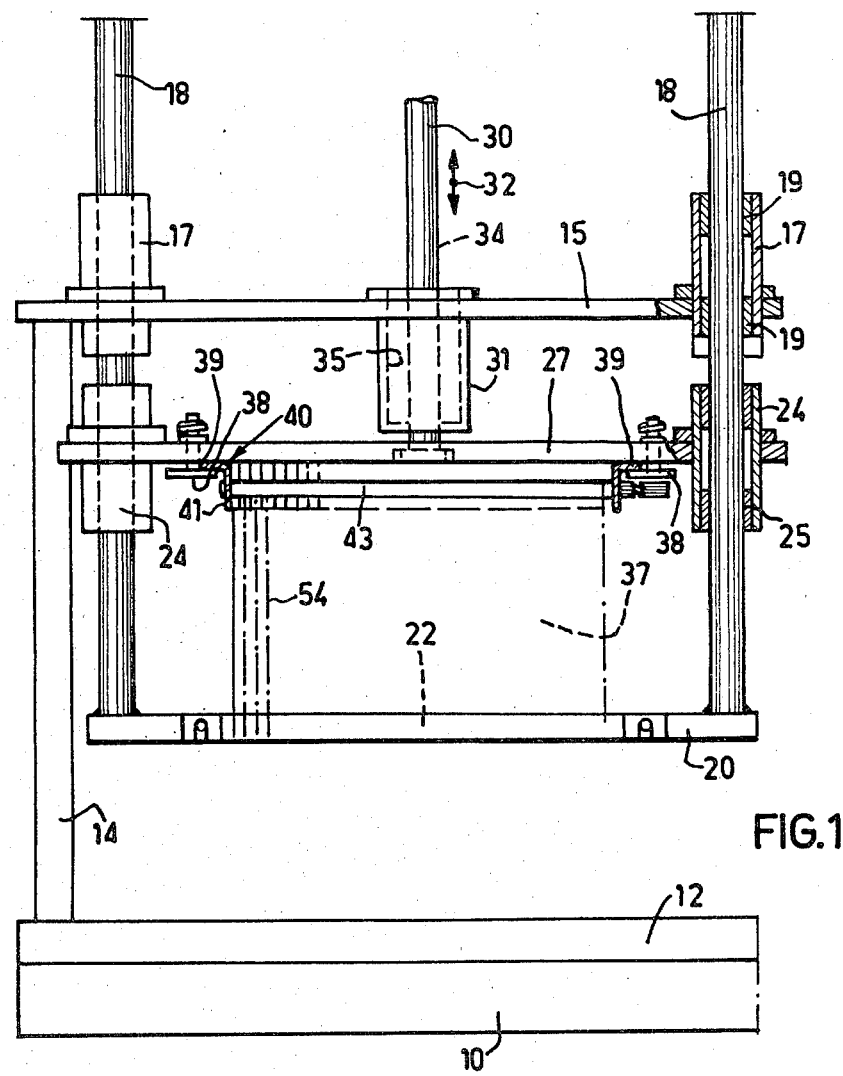
FIG. 1 of the drawing is a schematical elevational view of a detail of one embodiment of the meat tendering device according to the invention.
Figure 3:
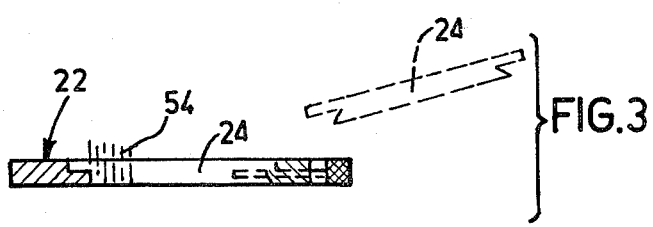
FIG. 3 is a cross-sectional view of one element of the grid incorporated in the device shown in FIG. 1.

Plate 15 supports at least two vertical sleeves 17 extending through corresponding holes provided in said plate; said sleeves are fixed to plate 15, e.g. by welding. Each sleeve 17 guides a column 18 slidably mounted therein, as shown particularly in the left hand portion of FIG. 1. Convenient bearing linings 19 are interposed between each sleeve 17 and the associated column 18.

A grid holder 20 is attached to the lower ends of columns 18 so as to extend horizontally, i.e. parallel to base 10. The distance between the grid holder 20 and the base 10 supporting plaquette 12 can be adjusted by appropriate means (not shown). Grid holder 20 supports a grid 22 which will be described in more detail herein-after.

Sleeves 24 provided with inner bearing linings 25 for facilitating sliding displacement are mounted, respectively on each column 18 between plate 15 and grid holder 20, and are integral with a planar plate 27 parallel to plate 15.

Plate 27 is integrally connected at its upper surface, to a vertical control rod 30 extending to a sleeve 31 affixed to plate 15. Control rod 30 is connected to manual or power-driven actuating means (not shown) adapted to displace plate 27 upwardly or downwardly in vertical direction, as indicated by arrow 32, possibly against the biasing force of a spring 34 surrounding rod 30 and bearing at its lower end on a cup-shaped portion of sleeve 31, and at its upper end on a bearing portion (not shown) provided on rod 30.

At its lower surface, plate 27 receives a blade holder block designated generally by reference numeral 37, plate 27 being provided for this purpose with two sliding guides 38. Sliding guides 38 cooperate with rails 39 associated with block 37 in such a manner that block 37 can easily be mounted by simple interlocking insertion and can also be dismounted easily.

With a view to safely maintaining block 37 in place, sliding guides 38 comprise means for displacing the same toward plate 27, whereby block 37 is pressed, or clamped, against plate 27. For this purpose sliding guides 38 may be constituted for example by a plate supported by threaded rods under plate 27, said rods extending through holes or recesses provided in the latter, and bearing nuts at their ends; by tightening said nuts, the blades and said plate can be displaced toward each other.

Block 37 is constituted by a framework comprising a first L-shaped angle-bar 40 one flange or first part of which forms one of rails 39, while two mutually spaced parallel rods 43 perpendicular to the other flange are fixed each at one of their respective ends to said other flange or second part. The respective other ends of rods 43, which are opposed to said other flange of the L-shaped angle-bar, are connected to each other by a cross-member 45, and a second angle-bar 46 similar to angle-bar 40 is disposed between cross member 45 and angle-bar 40; one of the flanges or second part of angle-bar 46 is provided with holes or recesses 48 through which extend rods 43, while the other flange or first part of angle-bar 46 constitutes the second rail 39 of block 37.

Screws 50 screwed into threaded holes provided in cross-member 45 bear at one of their respective ends on flange 47 of angle-bar 46 and are provided at their respective opposite ends each with a knurled head 51. By tightening these screws, angle bars 46 and 40 can be displaced toward each other.

The framework thus constituted by angle-bars 40 and 46 and rods 43 supports cutting-blade holder blades 52 comprising each, in the present embodiment a steel blade 53 bearing two teeth 54, in a manner similar to that of a comb, said blade 53 being arranged in a symmetry plane of a parallelepipedic element 55 which constitutes the back of the related blade, at a location opposite to teeth 54.

Said element constituting the back of the blade is made, for example, of a plastic material and may be obtained advantageously by moulding onto the comb. Preferably said element extends over the entire length of the comb, from one end to the other end thereof. Blade 53 further has two fingers or extensions 56 opposed to, and arranged in alignment with, each other, said fingers extending, respectively, toward the end of blade back 55.

Fingers 56 are adapted to rest on rods 43 when blades 53 are juxtaposed between said rods, the respective blade backs 55 engaging each other (FIGS. 1 and 2) so as to determine the intervals between the blades.

When angle-bars 40 and 46 are displaced toward each other the blades are clamped and maintained in the desired position. The dimension of the blade backs is selected so that there upper surfaces are located in the plane of the flanges 39 of angle-bars 40 and 46 when fingers 56 rest on rods 43. Said upper surfaces then engage the lower surface of plate 27 when block 37 is placed under said plate 27, blades 53 then being positively maintained in the desired position.

The ends of cutting blades 54 engage the intervals defined of the above-mentioned grid 22.

It will be understood that blade 53 may be replaced by needles mounted in positioning elements similar to elements 55 described hereinabove.

The above described construction allows the blades and, more generally, the blade holder block to be dismounted in a particularly easy and rapid manner. Thus these elements can very easily be cleaned and disinfected and then be mounted again, and the user can easily meet the most severe hygiene requirements. Also with a view to facilitating the mounting and dismounting of the device, the grid 22 may advantageously be constituted by removable small plates, such as 24, provided with slots for accommodating and guiding the blades or needles, and maintained in frame 20 by any convenient means.

According to a particularly advantageous feature of the invention, with a view to providing for still more efficient cleaning, said slots extend from a location adjacent to one edge of the plaquette to the opposite edge of said plaquette, so as to open into said latter edge.

During the downward motion of plate 27 and block 37, the blades or needles are guided by a grid 22, whereby the risk of deformation and rupture of these perforating elements is eliminated.

Sleeves 17 allow the grid to be adjusted at a given distance from plaquette 12 such that the piece of meat to be tenderized does not incur any danger of being compressed.

The invention is not limited to the embodiments shown and described herein; many variants and modifications may be envisaged by those skilled in the art without departing from the spirit and scope of the invention as defined in the appended claims.

What is claimed is:
1. A meat tenderizing device comprising:
A. a supporting frame;
B. a base connected at the bottom of said supporting frame, said base adapted to receive the meat to be tenderized;
C. a movable blade holder assembly on said supporting frame, said blade holder assembly being movable toward and away from said base and further comprising:
   i. a framework including:
      (a) a pair of clamping flanges in spaced relation to each other;
      (b) a pair of rods in substantially parallel spaced relation to each other extending between said clamping flanges;
   ii. a plurality of independently removable cutting blades carried side by side in said framework each of said blades including:
      (a) a back, said back being thicker than said blade, said back defining spaces between each of said blades carried by said framework, said blades being mutually engaged by said clamping flanges;
      (b) said backs having ends, extensions from said ends, said extensions supported on said rods;
   iii. a plate having a lower surface located above said backs in substantially non-yielding engagement therewith; and
D. grid elements located above said base, said grid elements defining spaces therebetween, said blade holder assembly facing said grid with said blades positioned to pass through said spaces.
2. A meat tenderizing device according to claim 1, wherein the back of each blade is made of a plastic material and obtained by a moulding process.
3. The meat tenderizing device defined in claim 1 or 2 wherein:
(a) one end of said rods is attached to one of said clamping flanges;
(b) the other of said clamping flanges has holes therein, the other end of said rods passing therethrough,
(c) said framework further comprising:
   i. a cross member connecting each of said other ends, said cross member having at least one threaded hole therein; and ii. a threaded rod having ends threaded in said threaded hole, one end of said threaded rod resting on the other of said clamping flanges whereby said threaded rod biases said clamping flanges together.

4. The meat tenderizing device of claim 3 having means for holding said clamping flanges in engagement with said lower surface wherein:
 (a) said clamping flanges are substantially L-shaped angle bars, the first part of each of said angle bars being substantially perpendicular to the axes of said rods, the second part of each of said angle bars being substantially parallel to said axes, said second part extending outwardly from said framework forming rails; and
 (b) said plate has sliding guides thereon, said sliding guides cooperating with said rails.

5. The meat tenderizing device of claim 4 wherein at least one of said guides has means for displacing said guide toward said plate thereby clamping said rail.

* * * * *